United States Patent
Dickey

(10) Patent No.: US 9,652,373 B2
(45) Date of Patent: May 16, 2017

(54) ADAPTIVE STATISTICS FOR A LINEAR ADDRESS SPACE

(71) Applicant: International Business Machines Corporation, Armonk, NY (US)

(72) Inventor: Clement L. Dickey, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 136 days.

(21) Appl. No.: 14/106,996

(22) Filed: Dec. 16, 2013

(65) Prior Publication Data
US 2015/0169227 A1 Jun. 18, 2015

(51) Int. Cl.
*G06F 12/02* (2006.01)

(52) U.S. Cl.
CPC .. *G06F 12/0223* (2013.01); *G06F 2212/1044* (2013.01)

(58) Field of Classification Search
None
See application file for complete search history.

(56) References Cited

U.S. PATENT DOCUMENTS

| 6,209,061 | B1 | 3/2001 | Nelson et al. | |
|---|---|---|---|---|
| 6,738,886 | B1* | 5/2004 | Mendoza et al. | 711/173 |
| 8,335,904 | B1* | 12/2012 | Kitchen | G06F 13/28 711/154 |
| 8,566,483 | B1* | 10/2013 | Chen | G06F 3/0605 711/114 |
| 2005/0231849 | A1* | 10/2005 | Rustagi et al. | 360/97.01 |
| 2008/0255718 | A1* | 10/2008 | Tuff | G01P 1/07 701/32.6 |
| 2009/0070347 | A1* | 3/2009 | Mignet et al. | 707/100 |
| 2011/0320417 | A1* | 12/2011 | Luo et al. | 707/693 |
| 2012/0272036 | A1 | 10/2012 | Muralimanohar et al. | |
| 2013/0042237 | A1* | 2/2013 | Cardona et al. | 718/1 |

(Continued)

FOREIGN PATENT DOCUMENTS

| EP | 2216722 A2 | 8/2010 |
|---|---|---|
| WO | 2011038257 A1 | 3/2011 |

OTHER PUBLICATIONS

Piasecki, Dave. "Exponential Smoothing Explained" on InventoryOps.com. Captured by Wayback Machine on Jan. 19, 2013. Also available at <http://www.inventoryops.com/articles/exponential_smoothing.htm>.*

(Continued)

*Primary Examiner* — Midys Rojas
*Assistant Examiner* — Jane Wei
(74) *Attorney, Agent, or Firm* — Cantor Colburn LLP; Bryan W Butler

(57) ABSTRACT

Embodiments relate to adaptive memory apportioning. An aspect includes, statistics captured for a plurality of elements of a partitioned linear address space. Each addressable location is an element in the address space. Subspaces of the partitioned linear address space are rated based on captured statistics of at least one element. The subspaces are differentiated, based on the frequency of access, as being of lesser and greater significance. The boundaries that separate the subspaces are altered so as to effect coarser granularity in the subspaces determined to have the lesser significance and finer granularity in the subspaces determined to have the greater significance.

8 Claims, 2 Drawing Sheets

(56) References Cited

U.S. PATENT DOCUMENTS

2014/0181432 A1* 6/2014 Horn .......................... 711/159
2014/0189281 A1* 7/2014 Sokol, Jr. .................... 711/171
2014/0274305 A1* 9/2014 Shimabukuro ..... G07F 17/3241
                                                                                     463/24

OTHER PUBLICATIONS

Tevanian Jr., Avadis, "Architecture-Independent Virtual Memory Management for Parallel and Distributed Environments: The Mach Approach", ip.com electronic publication Mar. 29, 2007, original publication date Dec. 31, 1987, Database entry Copyright (c) Software Patent Institutel, 145 pages.

Thaler, D. et al., "The Internet Multicast Address Allocation Architecture (RFC2908)", ip.com publication Aug. 15, 2001, original publication date Sep. 1, 2000, Copyright (C) The Internet Society (2000), 15 pages.

* cited by examiner

ADAPTIVE STATISTICS FOR A LINEAR ADDRESS SPACE

BACKGROUND

The present disclosure relates generally to linear address space management, and more particularly, to adaptive statistics for determining linear address space biasing.

In computing environments, memory refers to physical devices used for the temporary or permanent storage of data, instructions, and computer programs. Memory is commonly used in various digital electronic devices, such as computers. The term "primary memory" is often associated with addressable semiconductor memory which includes integrated circuits (ICs) having silicon-based transistors and other components. The semiconductor memory is organized into memory cells, each of which stores one binary bit (0 or 1), and these cells are then grouped into words of a fixed word length. Memory addresses are fixed-length sequences of bits conventionally displayed and manipulated on the memory device. A digital electronic device such as a computer's memory consists of many memory locations, each having a physical address which enables other devices to use and access them.

BRIEF SUMMARY

Embodiments include a method, system, and computer program product for adaptive memory apportioning.

The method includes capturing statistics for a plurality of elements of a partitioned linear address space. Each addressable location is an element in the address space. The method also includes rating subspaces of the partitioned linear address space based on captured statistics of at least one element. The method also includes differentiating the subspaces based on frequency of access and designating each of the subspaces as being at least one of a lesser significance and a greater significance based on the frequency of access. The method further includes altering boundaries that separate the subspaces so as to effect coarser granularity in the subspaces determined to have the lesser significance and finer granularity in the subspaces determined to have the greater significance.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Embodiments described herein are directed to an adaptive memory apportioning scheme that captures statistics for elements of a partitioned linear address space in which each addressable location is an element in the address space. The embodiments include rating subspaces of the partitioned linear address space based on the statistics, designating a significance value for the subspaces based on the frequency of access, and altering boundaries that separate the subspaces to effect a level of granularity based on the significance value.

Currently, a memory device can have different address schemes. One popular address scheme utilizes a linear address space. A linear address space, and a memory addressing scheme that utilizes it, allows digital electronic devices such as computers or simple processors to access the whole memory using a single address that fits in a location that is as little as a single register or instruction. Linear addressing greatly simplifies programming but requires more instruction word bits to be allocated for an address.

In order to utilize a linear addressing scheme in an effective manner, analyzing a history of access patterns for the address space can help in the design of a more efficient system. Such historical analysis may be implemented by partitioning the address space into fixed-sized portions referred to as "grains." Maintaining separate statistics for each grain is important. The partitioning may occur in the linear address domain, in a time domain, or both. In some embodiments, the address space may be so large that it is not feasible to store all the required history easily in the confined allocated space. Additional space may be acquired but at an additional expense. In some instances, statistical data can be stored in an "adjacent" area but this is not a common occurrence as this adjacent area needs to be both scalable as well as accessible. If no additional area is available for storage then selective pruning of the existing storage data is needed to retain the required statistical data. The pruning leads to storing statistics at a coarser granularity than is preferred or necessitated.

Figure 1:
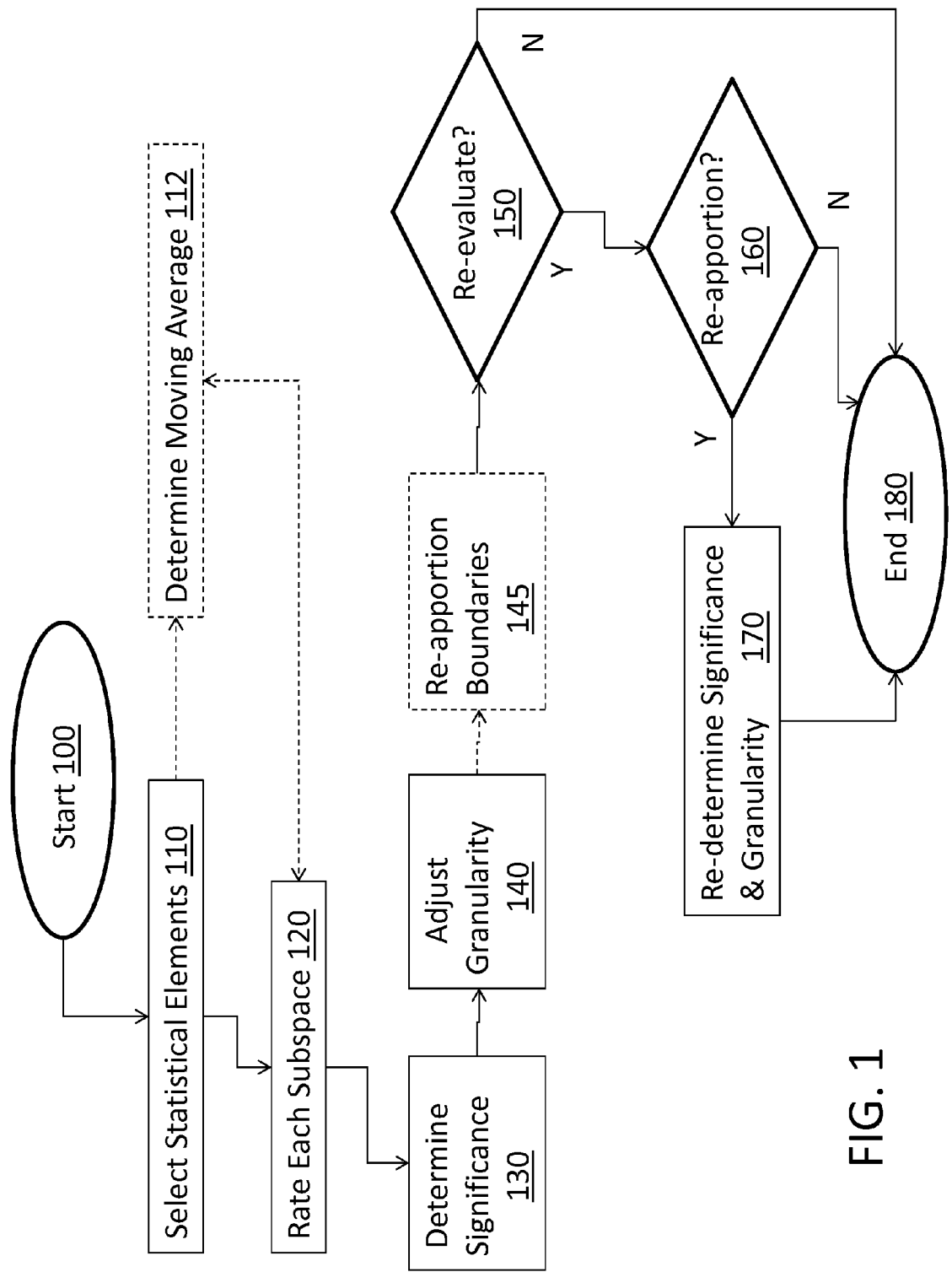
FIG. 1 is a flowchart illustration of an adaptive memory apportioning scheme in accordance with an embodiment.

FIG. 1 provides an adaptive memory apportioning scheme for capturing statistics for elements of a partitioned linear address space. The address space is partitioned into subspaces, each containing one more contiguous uniquely addressable elements. As will be discussed in detail later, the adaptive technique enables differentiation of the subspaces, based on a variety of different variables, each subspace being explored with more or less granularity. In one embodiment, this is performed by selecting one or more variables among statistically aggregated characteristics. These statistics may be historically stored in one embodiment or aggregated in a dynamic manner.

In block 100, the process begins in which one or more subspaces are selected among the plurality of subspaces for statistical aggregation and further evaluation (block 110). Some examples of such element characteristics can be frequency of access, latency or bandwidth. Other criteria for elements can also be selected as can be appreciated by those skilled in the art. In the embodiment shown in FIG. 1, the frequency of access is selected as the element characteristics.

Block 112 is an optional block in which an election of a moving average, such as an exponential moving average, may be made. A decay rate can also be selected. This block will be explained later in more detail.

The subspaces are rated based on captured statistics of at least one selected element as provided in block 120. For example, if frequency of access is selected as criteria, each unique access to each unique address determines this aspect. The statistical analysis can be provided by examining one or more counters and registers or, as can be appreciated by those skilled in the art, can include more sophisticated schemes.

The subspaces are designated, with one of them potentially being a more significant subspace and another subspace potentially being a less significant subspace. The designation is based on the rating of the statistical elements. This is shown in block 130 of FIG. 1. For ease of understanding, in this example only two subspaces are enumerated, namely "more significant" and "less significant" subspaces, but in alternate embodiments, a plurality of gradients and subspaces can be used as well. In such an alternate embodiment, for example, a full ordering denotation can be used.

The granularity of the less significant subspace is then reduced, and the granularity of the more significant subspace is increased. This is shown in conjunction with block 140. Block 140 is provided in a context in which "more significant" and "less significant" indicators are used as the selected criteria. The subspace designated as "more significant" may be deemed "more interesting" as it provides more information that is needed as supported by the frequency of access. This subspace is designated to be explored with a finer granularity because it promises to offer more relevant information. By contrast, the "less interesting" or less significant subspace will be explored with a coarser granularity in comparison to the more significant subspace (as the information is probably less relevant). In this way a more efficient use of the time and resources can be provided that greatly reduces operational costs. Where more than two subspaces are categorized, different levels of granularity may be selected accordingly.

Frequency of access can be dynamically determined as a matter of aggregation over a preselected time. It can be established by comparison to a preselected threshold or as a matter of percentage. When there is a change, re-evaluation (block 150) and re-apportionment (block 160) may be desired before process termination, as shown in block 180. In this instance, the process may re-determine the significance and granularity (block 170) before the process terminates in block 180. For ease of understanding, an example will be used. In a situation where the element selected is frequency of access, the frequency of access for a subrange A is determined to be twice that of the frequency of subranges B and C combined. In this case, subrange A is selected to be designated as an "interesting subrange" while subranges B and C are deemed to be designated as "less interesting subranges." In one embodiment, the statistical data are dynamically accumulated and when there is a change, the subranges can be re-evaluated and re-designated as shown in block 150. In different embodiments, this re-designation can be performed as a matter of comparison with other subranges or alternatively by comparing the frequencies to a preselected threshold access level.

Block 112 may now be re-examined. Frequency of access can be determined and accumulated as a matter of time for a pre-determined period or as stated can be calculated on an (exponentially) moving average. An example can be used to more clearly explain this concept. Subrange X has been determined to have the most number of access frequencies over a ten day period. However, subrange X has not been accessed in any substantial manner for the last 20 hours despite its past history. Subrange Y, by contrast, was accessed 30 percent less than subrange X in the same time period of ten days but has been very active for the past 20 hours. In fact, subrange Y had a frequency of access of 2000 percent when compared to subrange X over the past 20 hours. When an exponential moving average scheme is used, subrange Y may be re-evaluated and re-designated as a more significant or more interesting, and subrange X may be re-designated as a less significant or interesting despite their 10 day period history. In some embodiments, an exponential decay factor can be selectively implemented to re-evaluate the statistical selections and re-designation. For example a decay factor of two can be selected per hour to readjust evaluation numbers. As another example, a decay factor of two can be selected per 1000 total accesses to readjust the evaluation numbers.

In this example, areas with more data accesses will be more fruitful in exploring and thus more "interesting" than the less frequently accessed areas with smaller access numbers from a statistical point of view. This may lead to an apportionment of address boundaries as shown in block 145. Looking back at the example of subranges A, B and C, in one embodiment, the re-apportionment of boundaries may cause subrange A to be divided into two portions while subranges B and C may be combined into one new subrange.

The adaptive technique of FIG. 1, in one embodiment can dynamically adjust the boundaries at which statistics are maintained so that the areas of greater significance contain finer subranges than the areas of lesser significance. In one embodiment, subrange sizes are adjusted so as to maintain equal, or at least similar, subrange significance, or "weight." In this embodiment, linear addresses are partitioned into a fixed number of subranges. In one example, the address space can be partitioned into a fixed number N of subranges numbered 0 to N−1. The space available for statistics places an upper bound on N. Subrange 0 has a lower boundary at the start of the linear address range (typically 0) and an upper boundary at H(0). Every other subrange i has a lower boundary at H(i−1), and an upper boundary H(i). Every subrange has a non-zero size $Z(i)=H(i)-H(i-1)$, a single non-negative statistic (hereafter called "weight") $W(i)$, and a "density" $D(i)=W(i)/Z(i)$. To maintain this invariant, for every subrange i, $W(i)*N==$ sum of $W(j)$ for $0<=j<N$. In this manner, every subrange has the same weight and the density $D(i)$ of each subrange is inversely proportional to its size $Z(i)$. An invariant can also be maintained by adjusting each subrange boundary H(i) left or right as necessary so that $D(i-1)$ remains constant (if H(i) moves left) or $D(i)$ remains constant (if H(i) moves right). That is, boundaries adjust between neighboring subranges, and the statistics' values inferred to be in the adjusted area transfer from the neighbor which lost area to the neighbor which gained area.

In order to provide ease of clarity, a couple of examples will now be explored with an understanding that as appreciated by those skilled in the art other embodiments and examples can be provided by alternate embodiments.

In a first example, the implementation requires the adjustment of many call boundaries and values whenever any weight W(i) is updated. That is computationally expensive, requiring O(N) modifications for every change. It is not necessary that each statistic W(i) be exactly the same, but only that the W(i) value be about the same order of magnitude. In a case where the weight can only increase, as is the case when it accumulates non-negative values such as access counts or latencies, the following technique can be used to maintain the invariant:

For every subrange i and pair of subranges j and j+1:

$$W(i)<=W(j)+W(j+1).$$

That is, no subrange can have a greater weight than any pair of adjacent subranges. The invariant in this case is maintained by using the following method. When a weight W(i) increases (or W(j)+W(j+1) decreases) such that W(i)>W(j)+W(j+1) for some j, split subrange i in two and merge subranges j and j+1. The cells between i and j can be renumbered so that these cells subranges consecutive indices in range [0 . . . N]. In this manner, subrange i is split exactly in half (or as near so as arithmetic will allow) with each new subrange having weight W(i)/2. Subranges j and j+1 become a single subrange with weight W(j)+W(j+1). This method requires fewer updates, the number depending on how one handles the renumbering of subranges. The method used here does not require an update to boundaries on every weight change. The invariant can even be altered to have fewer requirements. In such a case, for every subrange i, pair of subranges j and j+1, and constant K>=1, W(i)<= K*(W(j)+W(j+1)). That is, no subrange can have a weight more than some fixed proportion K greater than any pair of adjacent subranges.

In a second example, a more efficient approach can be provided. Using the technique of the previous example, overhead could be reduced if every index j does not have to be considered when W(i) increases (nor every index i when W(j)+W(j+1) decreases). Instead, in this example, N is typically small (initial desire was to keep N small) and the number of weight changes is large. Therefore, a cursor k which moves among cells at each weight change will likely visit each cell in a short time. The invariant of example one can in this way be approximated by examining, at each change of weight for W(i), only some subranges or subrange pairs near the cursor k.

The weights as described so far maintain a complete history; there is no provision for "reset." Reset poses a problem, because the weights are used not only to provide statistics to the user, but also to keep the dense subranges small and the sparse subranges large. To maintain cell boundaries across a reset, each cell can have two weights: (1) an exponential moving average weight which is used to decide when splits and merges occur, and which decays but is never reset, and (2) a simple weight which is reported to the user and may be reset to zero when desired. Using the exponential moving average allows the boundaries to adjust weighted by recent activity, but decouples the adjustment from the "reset" process.

The more or less significant subranges may not always be selected based on more expedient attributes such as access and frequency of use. In a second example where latency is selected another manner of subrange selection may be desired. In this example, a variety of devices may be in processing communication with one another as shown in FIG. 2.

Figure 2:
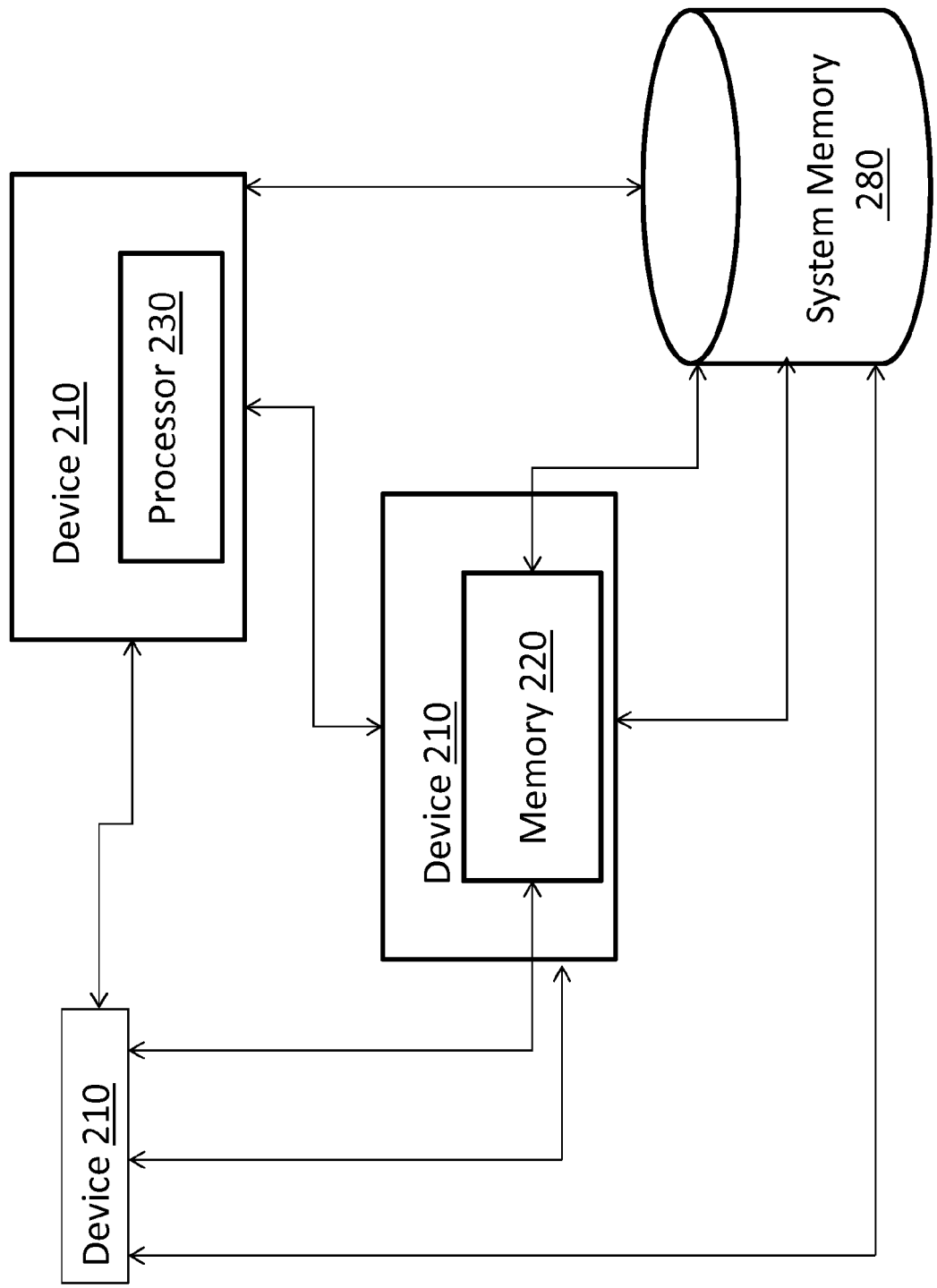
FIG. 2 depicts a block diagram of a computing environment in accordance with an embodiment.

FIG. 2 is a block diagram illustration of a computing environment as per one embodiment of the present invention having a facilitated network system. As illustrated in FIG. 2, the system comprises a plurality of devices 210 that are in processing communication with one another. This communication can be enabled through wired or wireless processing or other alternate means as can be appreciated by those skilled in the art. Each device 210 can also include one or more processors 230. Each device 210 can include its own internal memory as shown at 220, or be in processing communication with that device's internal memories, or in communication with one or more external memories such as the one shown in FIG. 2 at 280. The system memories 220 and 280 can also be in communication directly with one another or through the node and either be composed of a single unit that is shared among the many devices 210 or be composed of a plurality of components that are in processing communication with one another. In this manner, each device 210 can either exclusively use a single memory or alternatively use multiple memories at the same time or at different times to achieve processing optimization.

In addition, the processing means through which the devices 210 are in communication with one another are varied as can be appreciated by those skilled in the art. For example, in one embodiment, one or more devices 210 can be in processing communication with one another using the Internet or World Wide Web but in other embodiments they can be part of a secured and privatized network. Each device 210 can represent a variety of digital devices, such as but not limited to mobile devices, personal computers, servers or others such devices can further include display, input/output interfaces, printers or other components as can be appreciated by those skilled in the art.

Referring back to the latency example, a counter or similar scheme can be provided in one or more processors that measures time of processing. In such an example, the device with the most processing time may be selected to denote the more significant area. One reason for such designation may be that one such device may have processing problems and therefore if there is a pattern detected in which, for the same or similar instructions, a particular device L is taking more time than any other devices, device L may need to be taken off line and a new or existing device will then be provided as a replacement.

The latency issue does not need to be a problem of device processing alone. Even instruction processing time can be selected in a similar manner. In this scenario, it may be determined that an instruction I1 takes twice as the time of a second instruction I2 to complete. The same techniques can be used to delineate a solution that can then improve efficiency.

In a different embodiment, a technique can be implemented that can be used with multiple statistics. This is because, in some cases, more than one statistic may be of interest. For example, in using a disk input-output device (disk I/O) one may want to measure frequency of accesses, latency, and bandwidth at the same time. However, in such a technique, only a single "weight" value determines the partition boundaries. In order to achieve analysis of multiple statistical features, each of these statistics can be used in separate partitions, whose boundaries vary independently using the techniques suggested earlier.

Using the methodology and techniques already discussed, it is also possible in one embodiment to present data as a fixed-stride interface. Using existing tools as known to those skilled in the art, it is possible to view the data by fixed boundaries. Using the same concepts as discussed earlier, it would be easy to compute the appropriate weights after finding the corresponding subranges by binary search or interpolation search.

However, by using the techniques that improve the "split" decision as presented this problem can easily be resolved. This is because when a cell is "split" in two, half of its weight is assigned to each new cell. But it is likely that the weight was unevenly distributed in the cell. The split will cause weight to "leak" each from the more-used half to the less-used half. In order to lessen the leakage, the split of a subrange i can be weighted according to the densities of its neighbors, i−1 and i+1. That is, the densities of the two halves are weighted by the relative densities of their closest neighbors. In this way, the two halves may be assigned sizes (or weights) such that the two pieces, i_low and i_high, satisfy:

$$D(i\_\text{low})<D(i\_\text{high}) => D(i-1) <= D(i\_\text{low}) <= D$$
$$(i\_\text{high}) <= D(i+1), \text{ and}$$

$$D(i\_\text{low})>D(i\_\text{high}) => D(i-1) >= D(i\_\text{low}) >= D$$
$$(i\_\text{high}) >= D(i+1)$$

The linear address may be extended on the left (the low end) by reducing the number, typically 0, which designates the start of the left end. Similarly, the linear address space any be extended on the right (the high end) by increasing H[i−1]. In many cases, such changes do not affect the subspace statistics, and therefore do not require a re-evaluation of significance.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instns.

What is claimed is:

1. A method for executing a linear addressing scheme across a partitioned linear address space, comprising:
    capturing statistics for a plurality of elements of the partitioned linear address space to produce statistical data, wherein each element of the plurality of elements is an addressable location in the partitioned linear address space;
    rating subspaces of the partitioned linear address space based on the statistical data of at least one element and based on an exponential moving average of the statistical data having a decay rate specified by at least one of a time value and a threshold value of measured statistics to produce a corresponding weight of each subspace comprising a first weight and an exponential moving average weight;
    differentiating the subspaces based on frequency of access;
    designating each of the subspaces as being at least one of a lesser significance and a greater significance based on the frequency of access;
    altering boundaries that separate the subspaces, in accordance with the statistical data dynamically accumulated based on changes to the corresponding weight of each subspace, to effect coarser granularity in the subspaces designated to have the lesser significance and finer granularity in the subspaces designated to have the greater significance; and
    readjusting the partitioned linear address space to form new boundaries, the readjusting comprising at least one of splitting and merging the subspaces based on continued dynamic accumulation of the statistical data and the corresponding weight of each subspace,
    wherein the exponential moving average weight is utilized select when the at least one of splitting and merging occur, wherein the splitting comprises splitting a subspace into two halves, and each subspace comprises a density based on the weight of the subspace and a subspace size,
    wherein the densities of the two halves are weighted by the densities of its' adjacent subspaces to prevent uneven subspace distribution,
    wherein the exponential moving average does not reset during a reset process to decouple the readjusting of the partitioned linear address space from the reset process to maintain the new boundaries across the reset process,
    wherein the first weight is reported to a user and is set to zero during the reset process.

2. The method of claim 1, wherein the altering of the boundaries effects equal significance for each of the subspaces.

3. The method of claim 1, further comprising:
    reevaluating a significance status of the subspaces; and
    changing the significance status based on the re-evaluating after any splitting, merging and subsequent forming of a new partitioned linear address space.

4. The method of claim 1, wherein more than one statistical element is used to rate subspaces as having the greater significance and the lesser significance.

5. The method of claim 1, wherein more than one rating is used such that the subspaces are fully ordered by significance.

6. The method of claim 1, wherein the two halves are assigned sizes that satisfy a low and high range.

7. A computer program product comprising a non-transitory computer readable storage medium having program code for executing a linear addressing scheme across a partitioned linear address space embodied therewith, the program code executable by a processor to:
    capture statistics for a plurality of elements of the partitioned linear address space to produce statistical data, wherein each element of the plurality of elements is an addressable location in the partitioned linear address space;
    rate subspaces of the partitioned linear address space based on the statistical data of at least one element and based on an exponential moving average of the statistical data having a decay rate specified by at least one of a time value and a threshold value of measured statistics to produce a corresponding weight of each subspace comprising a first weight and an exponential moving average weight;
    differentiate the subspaces based on frequency of access;
    designate the subspaces as being of at least one of a lesser significance and a greater significance based on the frequency of access;
    alter the boundaries that separate the subspaces, in accordance with the statistical data dynamically accumulated based on changes to the corresponding weight of each subspace, to effect coarser granularity in the subspaces designated to have the lesser significance and finer granularity in the subspaces designated to have the greater significance; and
    readjusting the partitioned linear address space to form new boundaries, the readjusting comprising at least one of splitting and merging the subspaces based on continued dynamic accumulation of the statistical data and the corresponding weight of each subspace,
    wherein the exponential moving average weight is utilized to select when the at least one of splitting and merging occur, wherein the splitting comprises splitting a subspace into two halves, and each subspace comprises a density based on the weight of the subspace and a subspace size,
    wherein the densities of the two halves are weighted by the densities of its' adjacent subspaces to prevent uneven subspace distribution, wherein the exponential moving average does not reset during a reset process to decouple the readjusting of the partitioned linear address space from the reset process to maintain the new boundaries across the reset process, wherein the first weight is reported to a user and is set to zero during the reset process.

8. A system for executing a linear addressing scheme across a partitioned linear address space, comprising:

memory partitioned into subspaces as the partitioned linear address space to produce statistical data, wherein each element of the plurality of elements is an addressable location in the partitioned linear address space;

a counter for keeping the statistical data for a plurality of elements relating to each subspace of the partitioned linear address space, wherein the statistical data is dynamically accumulated based on changes to a corresponding weight of each subspace comprising a first weight and an exponential moving average weight; and a processor configured to:
rate the subspaces based on the statistical data of at least one element and based on an exponential moving average of the statistical data having a decay rate specified by at least one of a time value and a threshold value of measured statistics to produce a corresponding weight of each subspace, determine in accordance with statistical data which subspaces are of greater significance and which subspaces of lesser significance, and alter boundaries that separate the subspaces, in accordance with the statistical data dynamically accumulated based on changes to the corresponding weight of each subspace, to reduce granularity of apportioned areas having the lesser significance in comparison to apportioned, and readjust the partitioned linear address space to form new boundaries, the readjusting comprising at least one of splitting and merging the subspaces based on continued dynamic accumulation of the statistical data and the corresponding weight of each subspace, wherein the exponential moving average weight is utilized select when the at least one of splitting and merging occur, wherein the splitting comprises splitting a subspace into two halves, and each subspace comprises a density based on the weight of the subspace and a subspace size, wherein the densities of the two halves are weighted by the densities of its' adjacent subspaces to prevent uneven subspace distribution, wherein the exponential moving average does not reset during a reset process to decouple the readjusting of the partitioned linear address space from the reset process to maintain the new boundaries across the reset process, wherein the first weight is reported to a user and is set to zero during the reset process.

* * * * *